US011238014B2

(12) United States Patent
Rudek et al.

(10) Patent No.: US 11,238,014 B2
(45) Date of Patent: Feb. 1, 2022

(54) DISTRIBUTED VERSION CONTROL FOR TRACKING CHANGES IN WEB APPLICATIONS

(71) Applicant: INTERNATIONAL BUSINESS MACHINES CORPORATION, Armonk, NY (US)

(72) Inventors: Krzysztof Rudek, Nowy Wisnicz (PL); Tomasz Hanusiak, Cracow (PL); Grzegorz P. Szczepanik, Cracow (PL); Konrad W. Komnata, Cracow (PL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 436 days.

(21) Appl. No.: 16/209,309

(22) Filed: Dec. 4, 2018

(65) Prior Publication Data

US 2020/0174978 A1    Jun. 4, 2020

(51) Int. Cl.
*G06F 16/00* (2019.01)
*G06F 16/18* (2019.01)
*G06F 21/62* (2013.01)
*G06F 16/953* (2019.01)
*G06F 16/958* (2019.01)

(52) U.S. Cl.
CPC ........ *G06F 16/1873* (2019.01); *G06F 16/953* (2019.01); *G06F 16/972* (2019.01); *G06F 21/6209* (2013.01)

(58) Field of Classification Search
CPC .. G06F 16/1873; G06F 16/953; G06F 16/972; G06F 21/6209
See application file for complete search history.

(56) References Cited

U.S. PATENT DOCUMENTS 9,256,341 B2    2/2016 Megiddo et al.
9,317,254 B1 *  4/2016 Yim ........................ G06F 8/447
(Continued)

OTHER PUBLICATIONS

Tutorialspoint, Git—Quick Guide, published prior to 2015 as shown by web.archive.org, retrieved on Mar. 10, 2021, retrieved from the internet <URL: https://www.tutorialspoint.com/git/git_quick_guide.htm> (Year: 2015).*

(Continued)

*Primary Examiner* — Tyler J Torgrimson
(74) *Attorney, Agent, or Firm* — Robert Shatto; Andrew D. Wright; Roberts Calderon Safran & Cole, P.C.

(57) ABSTRACT

The present invention generally relates to web applications, and, more particularly, to a distributed virtual control system (VCS) configured to track changes by users to web applications. For this purpose, a system includes a user device configured to access a web server, which includes a web application stored in the web server, wherein the web application is accessible by another user device to make changes to the web application, which changes are stored in a historical collection of versions of the web application in an original repository. The user device is configured to allow the user device to access the historical collection of versions of the web application in the original repository, and to store the changes to the web application made by the other user device in the historical collection of versions of the web application in a first local repository in the user device.

19 Claims, 5 Drawing Sheets

(56) References Cited

U.S. PATENT DOCUMENTS

| | | |
|---|---|---|
| 9,317,526 B1 | 4/2016 | Klein |
| 2008/0120598 A1 | 5/2008 | Imeshev |
| 2009/0013267 A1 | 1/2009 | Cudich et al. |
| 2013/0339847 A1 | 12/2013 | Bartek et al. |
| 2014/0222758 A1 | 8/2014 | March et al. |
| 2014/0281872 A1 | 9/2014 | Glover |

OTHER PUBLICATIONS

Quora, What file types does Git support?, published Nov. 30, 2017, retrieved on Mar. 11, 2021, retrieved from the internet < URL: https://www.quora.com/What-file-types-does-Git-support> (Year: 2017).*

Mindfire Solutions, Efficient Usage of Git for Web Developers, published Aug. 8, 2017, retrieved on Mar. 11, 2021, retrieved from the internet <https://medium.com/@mindfiresolutions.usa/efficient-usage-of-git-for-web-developers-6de1bedfb7c> (Year: 2017).*

Git SCM, git-fsck, published Sep. 22, 2017, retrieved on Mar. 11, 2021, retrieved from the internet <URL: https://git-scm.com/docs/git-fsck/2.10.5> (Year: 2017).*

Git SCM, git-gui, published on Sep. 22, 2017, retrieved on Mar. 11, 2021, retrieved from the internet <URL: https://git-scm.com/docs/git-gui/2.12.5> (Year: 2017).*

Perera, Pasindu Rumal, Share/Collaborate code with Git without Github or internet, published Jul. 23, 2016, retrieved on Mar. 11, 2021, retrieved from the internet <URL: https://medium.com/@udnisap/share-collaborate-code-with-git-without-github-or-internet-2a71991c0089> (Year: 2016).*

Aadamsoo, "Web Based Project Management System", https://www.theseus.fi/bitstream/handle/10024/16996/Aadamsoo_Anne-Mai.pdf., Technology and Communication, Accessed Nov. 6, 2018, 57 pages.

Unknown, "Website Management Platform", Pantheon, https://googleweblight.com/i?u=https://pantheon.io/platform/ebsite-management-platform&hl=en-IN, Accessed Jan. 31, 2018, 5 pages.

Balliauw, "Version Control Systems Support in PhpStomn", Confluence Mobile, Jan. 31, 2018, 14 pages.

Unknown, "Choosing the right version control for your project" Git and TFVC version control | Microsoft Docs, Dec. 5, 2017, 7 pages.

Mell et al., "The NIST Definition of Cloud Computing", NIST, Special Publication 800-145, Sep. 2011, 7 pages.

* cited by examiner

DISTRIBUTED VERSION CONTROL FOR TRACKING CHANGES IN WEB APPLICATIONS

BACKGROUND

The present invention generally relates to web applications, and, more particularly, to a distributed version control system (VCS) configured to track changes by users in web applications.

Many systems are based on web applications. In many cases, a number of users have the ability to make changes to the web application, while other users are barred from making changes, but still have access to use the web application. The tools used for building web applications include pipeline steps and parameters that are described by lists of forms, scripts, commands, etc. Web applications include web based tools to control database systems or virtually any Software as a Service software (SaaS).

SUMMARY

In a first aspect of the invention, there is a system comprising: a user device configured to access a web server, which includes a web application stored in the web server, wherein the web application is accessible by another user device to make changes to the web application, which changes are stored in a historical collection of versions of the web application in an original repository, wherein the user device is configured to allow the user device to access the historical collection of versions of the web application in the original repository, and to store the changes to the web application, made by the other user device in a historical collection of versions of the web application, in a first local repository in the user device.

In another aspect of the invention, there is a method comprising: accessing a web server, via a user device, wherein the web server includes a web application stored in the web server, and wherein the web application is accessible by another user device to make changes to the web application, which changes are stored in a historical collection of versions of the web application in an original repository; accessing, via the user device, the historical collection of versions of the web application stored in the original repository; and storing the changes to the web application made by the other user device in a historical collection of versions of the web application in a first local repository in the user device.

In another aspect of the invention, there is computer program product, comprising a computer readable storage medium having program instructions embodied therewith, the program instructions executable by a computer device in a user device to cause the computer device to: perform a change on a web application, stored in a web server having a staging area for the web application, using a user-specific instance of the user device to change the web application in the staging area; store the change of the web application, and parameters of the change, in a historical change collection in an repository which is different than the staging area of the web server; and store the change of the web application, and parameters of the change, in a historical change collection in a local repository in the user device which is different than the staging area of the web server and different than the original repository.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
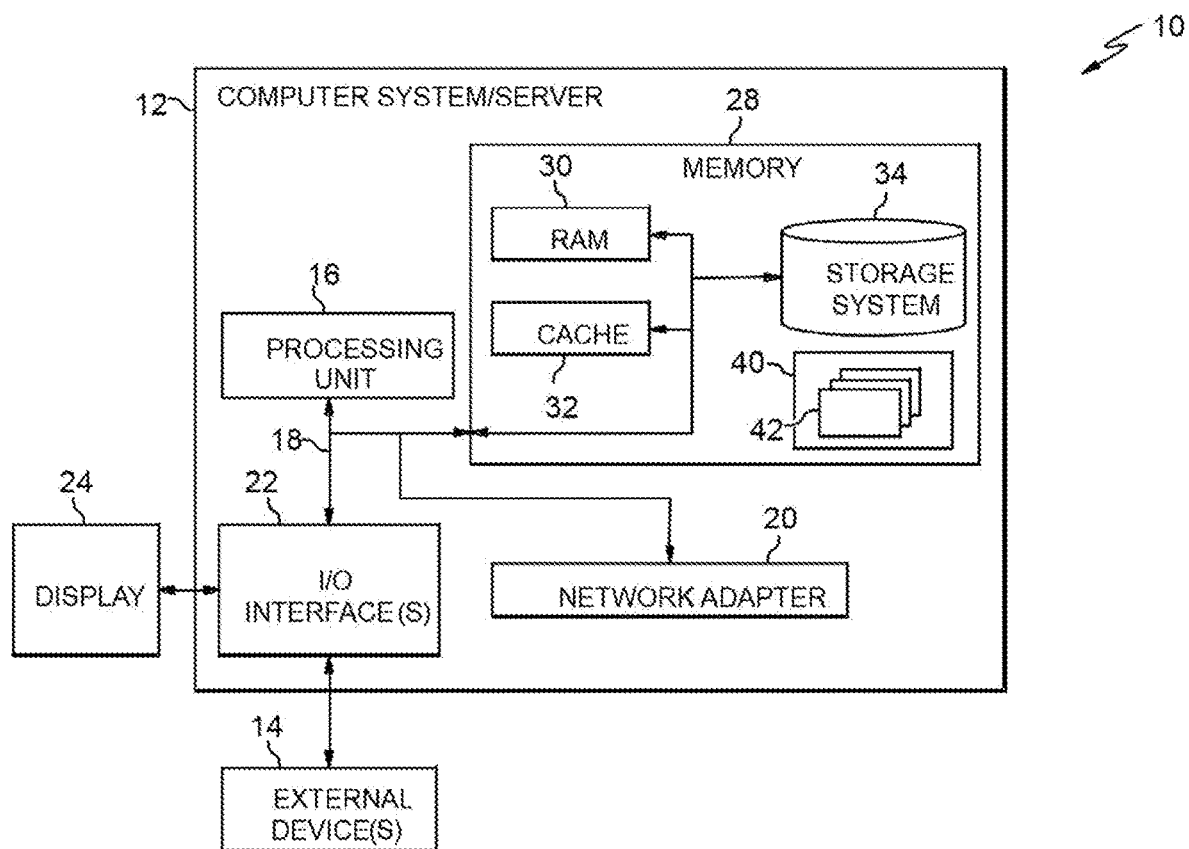
FIG. 1 depicts a cloud computing node according to an embodiment of the present invention.

The present invention generally relates to web applications, and, more particularly, to a distributed version control system (VCS) configured to track changes by users in web applications. Changes to web applications can result in the invalid operation of the pipelines of the web applications. Finding the cause can take many hours of tedious search for the source of the error.

In particular, this problem is particularly troublesome in situations where a number of users have the ability to change a web application. This causes problems when the changes made by one user cause a malfunctioning operation of the web application which is difficult to detect because a number of users are making changes and determining exactly which user change caused the error can be extremely time-consuming.

Currently, there are no convenient arrangements to track changes in web applications where a number of users have the ability to make changes to the web application. Version control systems designed to track changes in projects, such as GIT, have not been used for web applications because it is not been possible to track changes in the files outside of the staging area for the web application. Aspects of the present invention include creating a project based on files downloaded from a staging area of a web application on a Web server, and using the downloaded files to track changes in the files.

In particular, aspects of the present invention include implementing VCS for web applications. For example, aspects of the present invention include providing an original repository which stores changes, made by all users who have access to change the web application, in a historical collection of versions of the web application, which is outside of the staging area of the web application on the Web server. In embodiments, the historical collection of versions of the web application in the original repository is also accessible by users that have access to use the web application but that do not have the ability to change the web application. In further aspects of the invention, each user has access to its own local repository that stores the changes saved in the historical collection of versions of the web application in the original repository. Each user has the ability to revert to an earlier version of the web application stored in the local repository before the change made by a user which caused the malfunction. In this way, correction of the operation of the web application can be quickly carried out without a time-consuming error search.

In accordance with other aspects of the invention, each user device includes an error detector to recognize an error in operation of the latest version of the web application stored in its own local repository. In embodiments, each user device manually changes to an earlier version of the web application that operated properly, using a version control system-graphical user interface (VCS-GUI), in response to an indication by the error detector that faulty operation of the web application is now occurring. Alternatively, the VCS-GUI automatically reverts to an earlier, properly operating, version of the web application in response to detecting an error in the operation of the latest version of the web application, following the change to the web application by another user device having the ability to make such changes.

In a further aspect of the present invention, the user device that reverts to an earlier correctly operating version notifies other user devices coupled to the original repository that an error in web application operation has occurred. In accordance with still further aspects of the invention, the user device that detects the error and reverts to the earlier properly operating version of the web application notifies the original repository of the error to allow the original repository to also revert to the earlier version of the web application that was operating properly before the user changes were made.

In accordance with aspects of the invention, arrangements are provided for facilitating change management of a web application in which each user of the web application, using a user-specific instance thereof, upon said user performing a change on the web application, commits the change and its parameters to an original repository, specifically, into a historical change collection of the original repository. In accordance with further aspects of the invention, a second user, using a user-specific instance of the web application, is provided with a lookup functionality into the historical change collection saved in the original repository in order to be able to access the changed version of the web application, even if the second user does not have direct access to the web application in a web server itself, or the ability to make changes to the web application.

Advantageously, embodiments of the present invention provide technical solutions to the computer related problem of errors in web application operation introduced by users that have the ability to make changes in the web application. In implementations, the system performs an unconventional operation of storing changes made to a web application by a first user of the web application in a historical collection of versions of the web application in a data repository, and allowing access to the historical collection of versions of the web application by a second user which does not have the ability to change the web application, and to allow the second user to be able to revert to an earlier version of the web application rather than the version that includes the changes made by the first user. Further, aspects of the invention are implemented with particular computer hardware and software elements including web applications, data storage repositories, error detectors to detect faulty web application operation, and VCS-GUIs.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
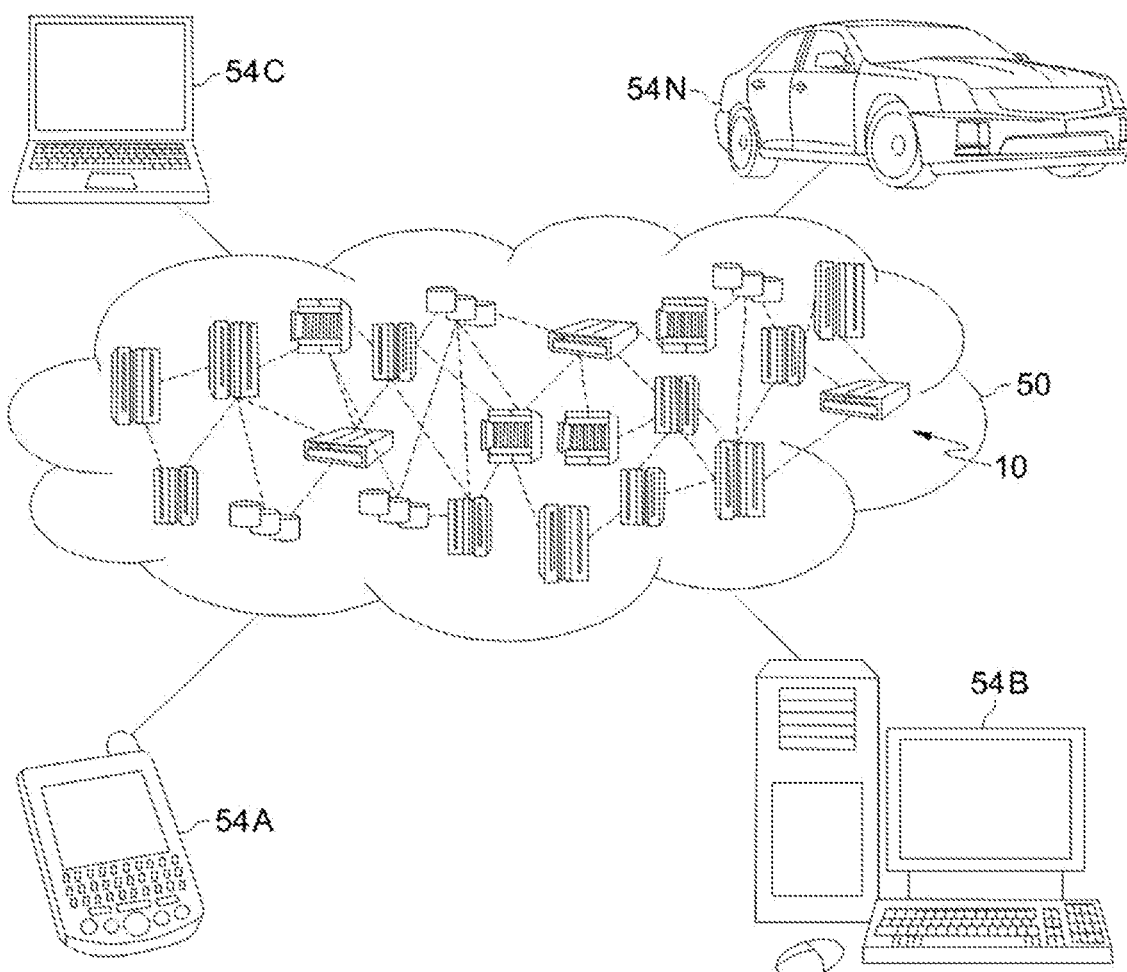
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
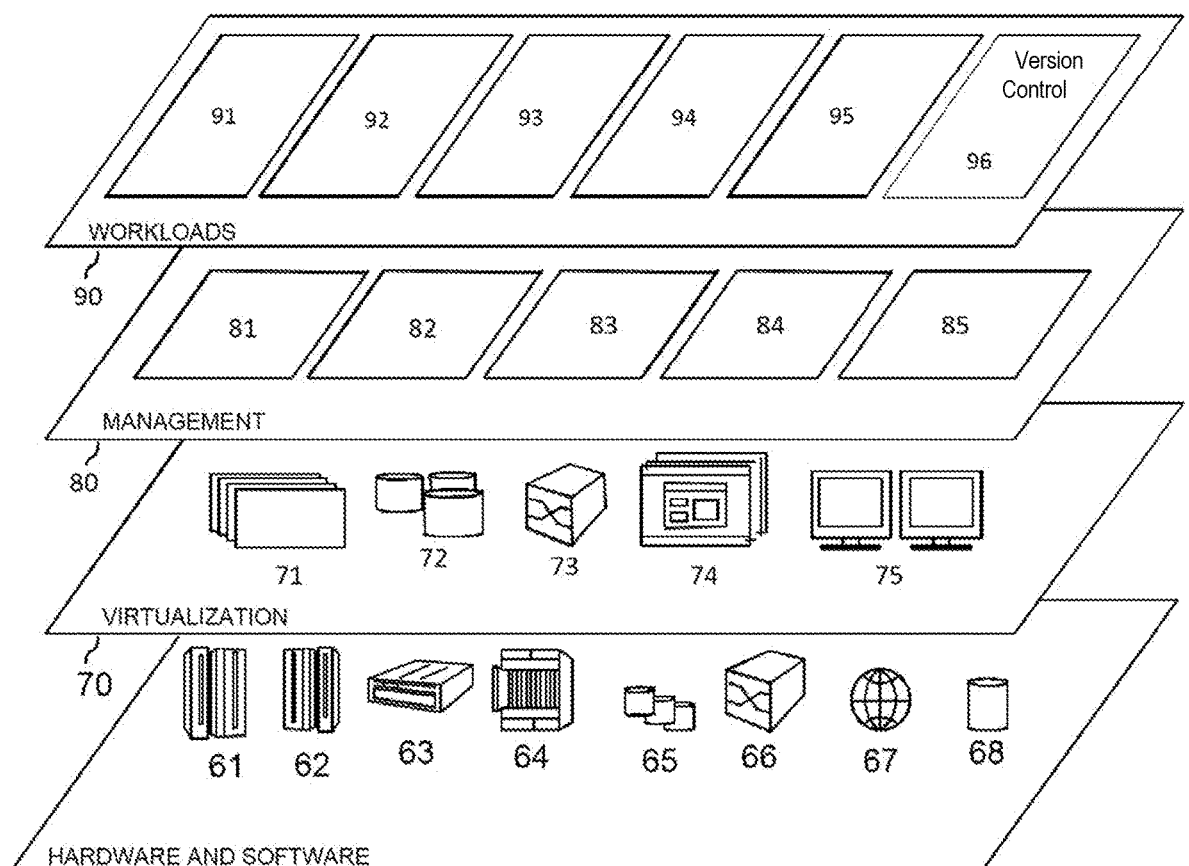
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and version control 96.

Figure 4:
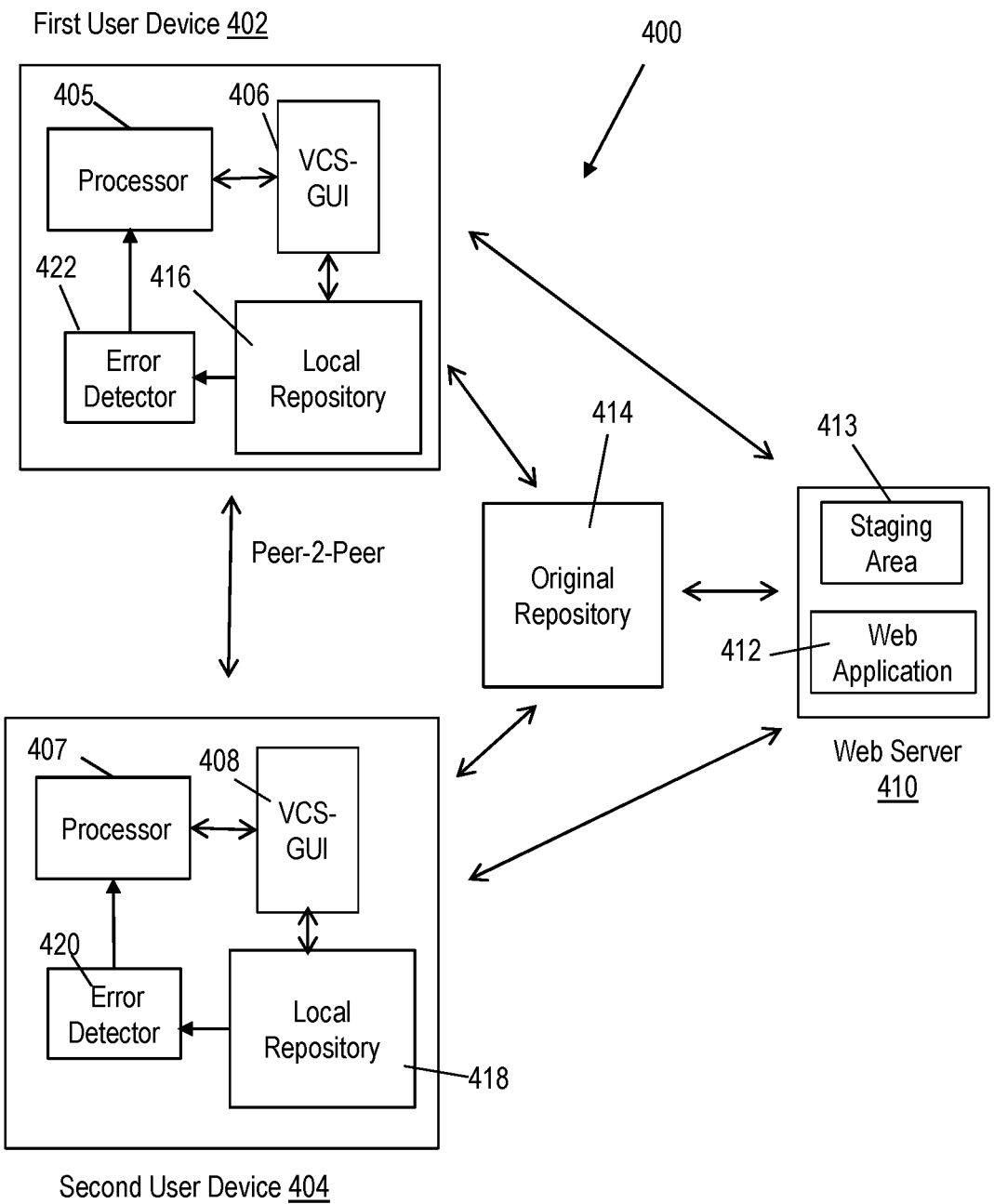
FIG. 4 shows a block diagram of an exemplary embodiment in accordance with aspects of the present invention.

FIG. 4 shows a block diagram of an exemplary embodiment in accordance with aspects of the invention. In this embodiment the version control system 96 shown in FIG. 3 is implemented by a distributed version control system (VCS) 400. The distributed VCS 400 includes a web application 412 and a staging area 413 provided in a web server 410, as well as a first user device 402, a second user device 404 and an original repository 414.

The first user device 402 communicates with the web server 410, e.g., via network communication, such that a user of the first user device 402 may make changes to the web application 412 via a VCS-GUI 406 present in the first user device 402. Examples of changes made by the first user device 402 include adding script into a text box, marking checkboxes, etc. The second user device 404 also communicates with the web server 410, e.g., via network communication. In embodiments, the second user device 404 has authorization to make changes to the web application via a VCS-GUI 408 present in the second user device 404. In alternative embodiments, the second user device 404 communicates with the Web server 410 and can access the web application 412 via the VCS-GUI 408, but is not authorized to make changes in the web application 412.

In embodiments, the first user device 402 includes a processor 405, the VCS-GUI 406, a local repository 416, and an error detector 422. The second user device 404 includes a processor 407, the VCS-GUI 408, a local repository 414, and an error detector 420. The first user device 402, the second user device 404 and the web server 410 each comprise a computer system that may include one or more elements of the computer system/server 12 of FIG. 1.

For example, in embodiments, the processors 405 and 407 are comprised of processors corresponding to the processing unit 16 of FIG. 1, the local repositories 416 and 418 are comprised of memory devices corresponding to the memory 28 of FIG. 1, and the VCS-GUIs 406 and 408 are comprised of I/O interfaces corresponding to the I/O interfaces 22 of FIG. 1. In embodiments, the web application 412 is comprised of a program module corresponding to the programming modules 42 of FIG. 1, and the staging area 413 is comprised of a memory device corresponding to the memory 28 of FIG. 1.

The original repository 414 is also comprised of a memory device, such as a database, which corresponds to the memory 28 of FIG. 1. In embodiments, the original repository 414 is an external element in communication, e.g., through network communication, with the Web server 410. In alternative embodiments, the web server 410 includes the original repository 414. Aspects of the invention are not limited to the exact number of modules shown in FIGS. 4, and fewer modules may be used by combining the functionality of one or more modules into another module. Conversely, more modules may be employed by splitting the functionality of one or more of the modules shown into plural different modules.

In embodiments, the web server 410 communicates with the original repository 414. In embodiments, the original repository 414 stores a historical collection of versions of the web application , which versions include web applications with changes made by the first user device 402. All changes are stored in the original repository 414 with date, the differences in content, and the author of the changes.

In embodiments, the second user device 404 communicates with the web server 410. In embodiments, the second user device 404 has access to use the web application 412, e.g., via a VGS-GUI 408, but it is not authorized to make changes in the web application 412. In alternative embodiments, the second user device 404 has access both to use the web application 412 and to make changes to the web application 412, e.g., via the VGS-GUI 408. In other alternative embodiments, the second user device 404 does not have any direct access to the web application 412, but does have access to the web application 412 indirectly via a local repository 418 which is connected to the original repository 414 and which stores the current version of the web application 412, as well as historical versions thereof from the original repository 414, as discussed below. In embodiments, the first and second user devices 402 and 404 are used by designers of the web application 412.

In embodiments, the original repository 414 communicates with both a local repository 416 and a local repository 418. In embodiments, the local repository 416 communicates with the first user device 402. Similarly, the local repository 418 communicates with the second user device 404. In accordance with aspects of the present invention, the local repositories 416 and 418 each access the historical collection of versions of the web applications stored in the original repository 414, and each of these local repositories 416 and 418 store the historical collection of web application versions which is stored in the original repository 414. As such, each of the local repositories 416 and 418 stores the same historical collection of versions of the web application that are stored in the original repository 414. Accordingly, each of the staging area 413, the historical collection of the versions of the web application in the original repository 414, and in the historical collections of versions of the web application in the local repositories 416 and 418 store the current version of the web application 412, with the latest changes.

When the local repositories 416 and 418 are current, the local repositories 416 and 418 and the original repository 414 all share the same historical record of the versions of the web application 412. In effect, the original repository 414 merges the historical record of the versions of the web application 412 stored in the local repositories 416 and 418. Because the various versions of the web application 412 are distributed for storage in the original repository 414 and the local repositories 416 and 418, and because each of the first and second user devices 402 and 404 have the ability to revert to earlier versions of the web application 412, the combination of the elements shown in FIG. 4 is referred to as the distributed version control system 400.

In embodiments, both the local repositories 416 and 418 are implemented as browser plug-ins in the first and second user devices 402 and 404. In embodiments, the first and second user devices 402 and 404 both have access to their respective local repositories 416 and 418 and perform operations including historical lookup of the versions of the web application, and rollback or reverting operations regarding which version of the web application 412 to use, as discussed below.

In accordance with aspects of the present invention, the staging area 413 stores the current version of the web application 412, including changes made by the first user device 402 via the VCS-GUI 406. In addition, in embodiments, web server 410 stores the current version of the web application 412, with the latest changes made by the first user device 402, in a historical collection of versions of the web application in the original repository 414, together with previous versions of the web application. In alternative embodiments, the staging area 413 is eliminated and the original repository 414 operates to store the current version of the web application 412, with the changes made by the first user device 402, without the need to use a staging area in the web server 410.

The historical collection of versions of the web application stored in the original repository 414 includes either all of the earlier versions of the web application 412 or a predetermined number of the most recent earlier versions of the web application 412. Thus, the original repository 414 stores the current version of the web application 412 stored in the staging area 413 (assuming that a staging area is used) as the latest version of the historical collection of web application versions stored in the original repository 414. As noted above, in alternative embodiments, the original repository 414 stores the current version of the web application 412 the historical collection of versions of the web application without the need for the staging area 413, thereby simplifying the overall structure.

In accordance with aspects of the present invention, the error detector device 420 detects errors in the operation of the latest version of the web application 412 (with changes made by the first user device 402) stored in the local repository 418. In embodiments, the error detector device 420 reports this erroneous operation of the version of the web application 412, most recently stored in the historical collection of web applications in the original repository 414 and the local repository 418, to the processor 407 of the second user device 404. In response to this error detection, the user of the second user device 404, in one embodiment, reverts from an operation using the current version of the web application 412, with changes from the first user device 402, to an earlier version of the web application 412 stored in the historical collection of versions in the local repository 418, which earlier version of the web application operates properly. As such, proper operation of the web application 412, specifically, the earlier version of the web application 412, is provided, notwithstanding defects in the changes made by the first user device 402 leading to a malfunction of the operation of the latest version of the web application 412, in a fast and convenient manner. With regard to this, it is noted that, in embodiments, the second user device 404 reverts the operation to an earlier version of the web application 412, notwithstanding the fact that the second user device 404 does not have the capability of making changes to the web application 412 stored in the web server 410, or, in alternative embodiments, does not even have access directly to the web application 412 at all.

The error detector 422 operates in a similar manner to the error detector 420, discussed above. Specifically, the error detector 422 detects errors in the operation of the web application 412, with the changes to the web application 412 which have occurred since the first user device 402 made the changes to the web application 412, and reports such errors to the processor 405 of the first user device 402. In embodiments, the first user device 402 reverts operations of the web application for the first user device 402 to an earlier version of the web application stored in the local repository 416, which earlier version operates properly.

In accordance with further aspects of the invention, the first and second user devices 402 and 404 are connected to one another in a peer-to-peer manner to notify each other of the reverting to an earlier version of the web application 412 due to the detection of erroneous operation using the latest version of the web application 412 stored in the respective local repositories 416 and 418. This allows the notified first or second user device 402 or 404 to also revert to an earlier version of the web application 412 to avoid erroneous operation with the latest version of the web application 412. In alternative embodiments, the first and second user devices 402 and 404 each advise the original repository 414 of any reverting by either the of the first and second user devices 402 and 404 to an earlier version of the web application 412, due to the discovery of errors in operation, respectively, by the error detector 420 or the error detector 422. In embodiments, the first and second user devices 402 and 404 are designers of the web application 412.

In embodiments, the distributed version control system 400, as well as the user first and second devices 402 and 404, and the web server 410 are computer devices having one or more components of the computer system/server 12 shown in FIG. 1. In particular, the distributed version control system 400, as well as the user first and second devices 402 and 404, and the web server 410, includes one or more program modules 42 shown in FIG. 1 to implement the operations described below. In addition, according to aspects of the present invention, the distributed version control system 400, as well as the user first and second devices 402 and 404, and the web server 410 are designed to operate in a cloud computing environment, such as shown in FIG. 2, to connect to remote servers via a cloud computing environment 50.

Although the embodiment shown in FIG. 4 shows two user devices, the invention could, of course, be utilized with any number of user devices. As an example of operation among three user devices, assume that a first user modifies the content of the web application 412 in the web server 410, and this change is stored in the original repository 414, with date, difference of content and author of the change (i.e., the first user). In the example, a second user makes a different change to the web application 412 in the web server 410, and this change is also stored in the original repository 414. Next, in the example, a third user accesses the latest version of the web application stored in the original repository 414, as well as the third user's own local repository, and determines that the latest version (with the changes made by the first two users) is not working correctly. In the example, the third user looks up the history of changes to the web application 412, that is, the multiple versions of the web application 412 stored in the original repository and the third user's local repository, and reverts to the earlier version with changes made by the first user but not the second user, thereby reverting to a version of the web application 412 which operates correctly.

Figure 5:
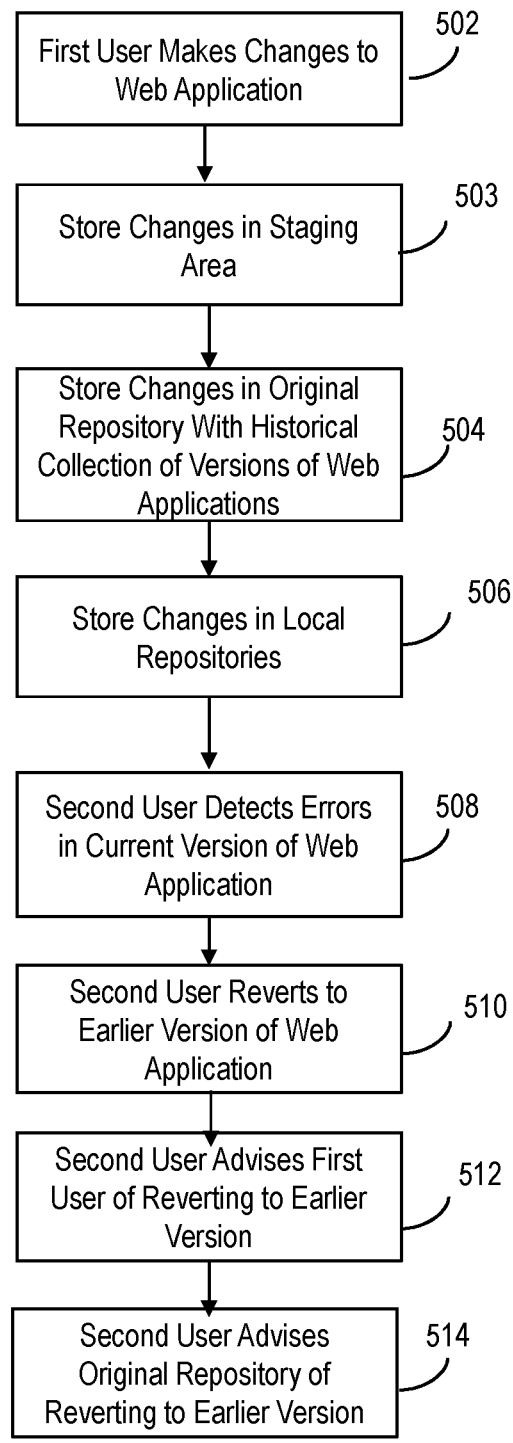
FIG. 5 shows a flowchart of operation of the exemplary embodiment in accordance with aspects of the present invention.

FIG. 5 depicts a flowchart of an exemplary method of operation in accordance with aspects of the invention. The steps of the method are performed in the environment of FIG. 4 and are described with reference to the elements and steps described with respect to FIG. 4.

In step 502, the first user device 402 makes changes to the web application 412 stored in the Web server 410. In step 503, the web server 410 stores the current changed version of the web application 412 in the staging area 413. In step 504, the original repository 414 stores the changed version of the web application, specifically in the historical collection of versions of the web application in the original repository 414. In step 506, the local repositories 416 and 418 store the changed version of the web application, specifically in a historical collection of the versions of the web application in each of the local repositories 416 and 418.

In step 508, the error detector 420 connected to the processor 407 in the second user device 404 detects an error in operation using the latest version of the web application 412, with the changes introduced by the first user device 402. In step 510, the processor 407 connected to the error detector 420 reverts operation to an earlier version of the application 412 when the error is detected. In step 512, the second user device 404 reports the reverting to an earlier version to the first user device 402 through a peer-to-peer connection, as shown in FIG. 4. Finally, in step 514, the second user device 404 notifies the original repository 412 that an erroneous operation has been detected using the web application 412 with the current changes, so that the current version of the web application stored in the original repository 414 is changed to eliminate the version with the error causing changes.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
a user device configured to access a web server, which includes a web application stored in the web server, wherein the web application is accessible by another user device to make changes to the web application, which changes are stored in a historical collection of versions of the web application in an original repository which is outside a staging area of the web server, wherein:
the user device is configured to allow the user device to access the historical collection of versions of the web application in the original repository, and to store the changes to the web application, made by the other user device in a historical collection of versions of the web application, in a first local repository in the user device, and
the user device is configured to notify other user devices coupled to the original repository that an error in an operation of the web application has occurred.

2. The system of claim 1, wherein the user device does not have access to make changes to the web application stored in the web server.

3. The system of claim 2, wherein the user device includes an error detector to allow the user device to detect errors in the versions of the web application stored in the first local repository.

4. The system of claim 3, wherein the first local repository comprises a browser plug-in in the user device.

5. The system of claim 3, wherein the user device is configured to communicate with the original repository by a version control system-graphical user interface (VCS-GUI).

6. The system of claim 5, wherein the user device includes a processor configured to allow the user device to revert to an earlier version of the web application saved in the first local repository, rather than a version of the web application with the changes made by the other user device stored in the historical collection of versions of the web application in the original repository.

7. The system of claim 6, wherein the processor is configured to revert operation of the user device to the earlier version of the web application automatically in response to the error detector determining that an error in operation has occurred when using the version of the web application with the changes made by the other user device.

8. The system of claim 7, wherein the first local repository is configured to be in communication with the original repository and a second local repository in the other user device.

9. The system of claim 1, wherein:
the user device is configured to be in communication with the other user device via a peer-to-peer connection to enable the user device to advise the other user device that the user device has reverted to the earlier version of the web application based on a detection of the error in the operation of the web application by an error detector, and
the user device is configured to advise the original repository that the user device has reverted to the earlier version of the web application based on the detection of the error in the operation of the web application by the error detector.

10. A method comprising:
accessing a web server, via a user device, wherein the web server includes a web application stored in the web server, and wherein the web application is accessible by another user device to make changes to the web application, which changes are stored in a historical collection of versions of the web application in an original repository which is outside a staging area of the web server;
accessing, via the user device, the historical collection of versions of the web application stored in the original repository;
storing the changes to the web application made by the other user device in a historical collection of versions of the web application in a first local repository in the user device;
detecting errors, by an error detector in the user device, in a version of the web application, stored in the first local repository, which includes the changes made by the other user device to the web application; and
notifying other user devices coupled to the original repository of the errors in the version of the web application.

11. The method of claim 10, wherein the user device does not have authorization to make changes to the web application stored in the web server.

12. The method of claim 10, wherein the first local repository is comprised of a browser plug-in in the user device.

13. The method of claim 10, wherein the user device is configured to be in communication with the original repository via a version control system-graphical user interface (VCS-GUI).

14. The method of claim 13, wherein the user device further comprises a processor configured to allow the user device to revert to an earlier version of the web application saved in the first local repository, rather than the version of the web application which includes the changes made by the other user device to the web application.

15. The method of claim 14, further comprising reverting operation of the user device to the earlier version of the web application automatically in response to determining that an error in operation has occurred when using the version of the web application with the changes made by the other user device.

16. The method of claim 15, wherein the first local repository is configured to be in communication with the original repository and a second local repository is configured to be in communication the other user device.

17. The method of claim 16, wherein the user device is configured to be in communication with the other user device via a peer-to-peer connection to enable the user device to advise the other user device that the user device has reverted to the earlier version of the web application based on a detection of an error of the errors in the version of the web application detected by the error detector.

18. A computer program product, the computer program product comprising a computer readable storage medium having program instructions embodied therewith, the program instructions executable by a computer device in a user device to cause the computer device to:
perform a change on a web application, stored in a web server having a staging area for the web application, using a user-specific instance of the user device to change the web application in the staging area;
store the change of the web application, and parameters of the change, in a historical change collection in an original repository which is outside the staging area of the web server;
store the change of the web application, and parameters of the change, in a historical change collection in a local repository in the user device which is outside the staging area of the web server and different than the original repository; and
notify other user devices coupled to the original repository that an error in an operation of the web application has occurred.

19. The computer program product of claim 18, wherein the user device is in peer-to-peer communication with another user device and configured to communicate to the other user device any changes which the user device makes to the local repository.

* * * * *